United States Patent [19]

Chand et al.

[11] Patent Number: 4,680,519
[45] Date of Patent: Jul. 14, 1987

[54] RECURSIVE METHODS FOR WORLD-TO-JOINT TRANSFORMATION FOR A ROBOT MANIPULATOR

[75] Inventors: Sujeet Chand, Charlottesville, Va.; Ahmad Sadre, Fox Point, Wis.

[73] Assignee: General Electric Co., Charlottesville, Va.

[21] Appl. No.: 778,830

[22] Filed: Sep. 23, 1985

[51] Int. Cl.$^4$ .............................................. G05B 19/18
[52] U.S. Cl. .................................... 318/568; 364/169; 364/513; 364/731; 364/191; 901/3
[58] Field of Search ............... 318/568, 568 A, 568 B, 318/568 AB, 568 E, 573, 567; 901/3–5; 364/191, 192, 193, 169, 167, 168, 513, 731, 815

[56] References Cited

U.S. PATENT DOCUMENTS

| | | | |
|---|---|---|---|
| 3,109,092 | 10/1963 | Lott | 318/573 |
| 4,031,369 | 6/1977 | Heaman | 318/573 X |
| 4,061,953 | 12/1977 | Matsumoto | 318/573 |
| 4,453,221 | 6/1984 | Davis | 318/568 |
| 4,456,961 | 6/1984 | Price | 318/568 X |
| 4,484,294 | 11/1984 | Noss | 318/568 |
| 4,507,738 | 3/1985 | Nozawa | 364/169 X |
| 4,541,060 | 9/1985 | Kogawa | 364/169 X |

OTHER PUBLICATIONS

Featherstone, R. "Position and Velocity Transformations Between Robot End-Effector Coordinates and Joint Angles", pp. 35–45, The International Journal of Robotics Research, vol. 2, No. 2 1983.

Primary Examiner—William M. Shoop, Jr.
Assistant Examiner—Patrick C. Keane
Attorney, Agent, or Firm—Ormand R. Austin

[57] ABSTRACT

A method for controlling an articulated robot manipulator with an offset wrist made with only rotary joints. The method relates to transforming a given position and orientation of the robot tool or end effector in Cartesian space to the equivalent joint angles of the robot. Commands generated from the joint angles are sent to actuators connected to the rotary joints, where the desired motion of the robot tool is generated. This method of transforming a point in Cartesian space to joint angles is accomplished by providing a cross-product and dot-product recursive methods that employ the robot geometry to determine the location of the the end effector, such that the computational complexity of the techniques allows real-time computations for current state of the art microprocessors.

12 Claims, 10 Drawing Figures

FIG.2 COORDINATE SYSTEM FOR OFFSET WRIST MANIPULATOR

RECURSIVE METHODS FOR WORLD-TO-JOINT TRANSFORMATION FOR A ROBOT MANIPULATOR

BACKGROUND OF THE INVENTION

1. Field of the Invention

This invention generally relates to a computer operated class of articulated robot manipulators and, more particularly, to continuous, iterative, real-time, computer controlled technqiues which are employed to transform a given position (X, Y, Z coordinates) and orientation (rotation matrix) of a robot tool or end effector in Cartesian space to equivalent joint angles of the robot (world-to-joint transformation).

2. Background Discussion

A robot is broadly defined as a programmable machine tool. Robot manipulator or manipulator as used herein is intended to refer to a programmable articulated machine or to tool handling apparatus. An articulated robot manipulator is made up of several joints connected together by rigid links. A joint can either be a rotary joint or prismatic joint. This application deals with rotary joint, manipulators. A motion of the manipulator is created by providing a drive signal to a motor coupled to a joint to thereby effect movement of a manipulator section about an axis of rotation. Many applications require the control of an end effector on specific trajectories in Cartesian space. One of the simplest trajectories of the end effector is a straight line. In order to move the robot end effector on a straight line, the line is divided into a large number of points and the robot joint angles are calculated at each point. Thus, by commanding the joint positions of the robot at a large number of points on the straight line, the desired motion of the robot end effector is generated.

There are presently two methods of implementing a desired motion: the programmed motion method, or the continuous controlled motion from a teach pendant (linear jog method) in which the robot joints are continuously updated on the fly or in real-time to control the trajectory. In the programmed motion aproach, the trajectory of the end effector is fixed. In the continuous controlled motion (jogging) the joint trajectories are computed on-line and can be modified in real-time.

The process of transforming a point in Cartesian space to joint angles is called a reverse transformation. The converse is a forward transformation in which, given a set of joint angles, defines a unique end effector position. The forward and reverse transformations are the key transformations in processing robot motions through computer control.

The reverse transformation for an articulated robot manipulator is usually non-unique. For a given position and orientation of the end effector and Cartesian space, there is more than one way of configuring the robot links to place the end effector at the desired point. The forward solution is always unique, since for a given set of joint angles, the end effector can only be at one position and orientation in space. Consequently, the reverse solution is computationally more intensive than the forward solution.

A common articulated robot geometry has six degrees of freedom. The joint angles starting from the base of the robot are commonly termed the base rotation, shoulder rotation, elbow rotation, wrist roll, wrist pitch and wrist yaw. Since it takes three degrees of freedom to reach any position in three dimensional space, the six degrees of freedom can be thought of as made up of two sets of three joints each, one set for position and the other set for orientation.

The complexity of determining the six joint angles of a six degrees of freedom robot for a given position and orientation space directly depends on the robot geometry. Some robot geometries yield a closed form reverse transformation. In a closed form solution, the joint angles are calculated by solving simultaneous equations. The solution of the equations for the joint angles does not require iterations or checks for a convergence. An efficient method for determination of the reverse solution has been formulated for a "spherical" wrist robot manipulator, Featherstone, R., *Position and Velocity Transformations Between Robot and Effector Coordinates and Joint Angles*, International Journal Robotics Res., Vol. 2, No. 2, pp. 35–45, 1983. A spherical wrist is defined by the intersection of the three wrist rotation axes. An efficient method for the reverse transformation of a spherical wrist robot is to initially determine the wrist position and de-couple the joint angles at the wrist joint. This method is generally applicable to any six degree of freedom robot geometry, where the wrist joint can be located from the faceplate position and orientation. However, although the solution is available in closed form, the reverse transformation degenerates in a singular configuration of the spherical wrist robot, i.e., into a singularity, in some conditions.

Certain robot geometries do not yield a closed form reverse transformation as in the spherical wrist geometry. A particular class of robots are those with an "offset wrist". The offset at the wrist joint prevents the three wrist rotation axes from intersecting at the wrist joint. In this case, the wrist cannot be directly located from the faceplate position and orientation.

Richard Paul, (Paul, R. C., *Robot Manipulators: Mathematics, Programming and Control*, MIT Press, Mass., 1981) has developed a general technique for the determination of a reverse transformation for any robot. This technique employs link matrices called the A-matrices, which are well known in the art. The product of the link matrices yields the faceplate position and orientation (known for reverse transformation). The systematic application of this general technique for the recursive evaluation of the reverse solution for any robot is described in the above mentioned book by Paul. His solution for the offset wrist robot geometry of FIG. 1, involves a simultaneous solution of two transcendental equations in two unknowns. One of the transcendental equations is a quadratic and the other is a quartic. Solutions to such polynomial equations can be generated by iterative numerical techniques. However, the computational complexity of such an endeavor is beyond real time computations for current state of the art microprocessor technology. The computational complexity of trajectory generation is a major concern. The prior art computations are so slow, it is not possible to compute joint angle updates at the same rate necessary as the update rate in commands to the joint angle servo motors.

It is an object of this invention to overcome this problem by providing cross-product and dot-product recursive methods that employ the robot geometry to develop a simple recursion for locating the end effector on an offset wrist, such that the computational complexity of the technqiues allows real-time computations for current state of the art microprocessor technology. The microprocessor computations calculate joint angle updates to satisfy sophisticated real-time demanding applications such as a robot controlled assembly line.

The dot-product and cross-product method, however, become slower when the wrist pitch angle approaches its zero value. This problem can be traced to a methematical singularity in the proposed solution at all configurations when the wrist pitch angle is at zero degress. Since the singularity causes a slower convergence of the reverse solution, a band around the wrist pitch angle is identified as the singularity band and an alternate solution is developed to handle the reverse transformation in the singularity band in real-time microprocessor controlled computations.

It is a further object of this invention to maintain positional accuracy and smooth motion, when the wrist pitch angle is within a singularity band so that the robot arm acts in a very precise manner.

It is another object of this invention to provide real-time computation for the singularity band to satisfy sophisticated real-time robot controlled applications.

SUMMARY OF THE INVENTION

An articulated offset wrist robot manipulator comprises a base, a shoulder, an elbow, a wrist, a knuckle (the offset), and a faceplate connected together by rigid links. The elbow to wrist link, wrist to knuckle link, and knuckle to faceplate link are commonly called the wrist roll link, wrist pitch link, and wrist yaw link. The robot is comprised of six axes of rotary motion or translational motion and has six degrees of freedom. The offset in the wrist prevents the three wrist rotation axes from intersecting at the wrist joint. The equivalent joint angles starting from the base of the robot, are the base rotation, shoulder rotation, elbow rotation, wrist roll, wrist pitch and wrist yaw. Since it takes three degrees of freedom to reach any position in three dimensional space, the six degrees of freedom can be thought of as made up of two sets of three joints each, one set for position and the other set for orientation.

From this geometry two very computationally fast methods are disclosed for computing the joint angles in real-time from a world Cartesian coordinate system. Since the faceplate position and orientation is known, this information is used to develop a cross-product method solution. From the faceplate orientation matrix, the vector along the wrist yaw link is determined and the knuckle point is located. Since the wrist roll link, wrist pitch link and wrist yaw link are mutually perpendicular, the cross-product of the vectors along the wrist roll link and wrist yaw link can be used to generate the vector along the wrist pitch link. Initially, the cross-product method is started by assuming that the wrist point is coincident with the knuckle location and locating the direction of the wrist pitch link. The iteration is repeated with the wrist position at the new location given by the wrist pitch vector, located by the previous iteration. This iteration converges to the correct wrist position. Once the wrist position is known, the robot joint angles are quickly and easily computed.

The dot-product method is similar to the cross-product method in that the wrist point is again located from the geometry of the last three robot links. Since the wrist yaw vector is known, the wrist must lie on a plane perpendicular to the wrist yaw vector and on a circle with the knuckle point as the center and radius equal to the wrist yaw link. The equation of the circle in the plane perpendicular to the knuckle to faceplate link is formulated and the wrist point is located such that the dot-product of the radius vector and the wrist roll vector is zero. The problem of finding the point on a circle that corresponds to the wrist location with a given arm configuration can be formulated as a second order transcendental equation, to which the roots of the wrist position lie on the circle. A Newton-Raphson numerical method is employed to converge to the correct root on the circumference of the circle. This root is the wrist position, which once known, the robot joint angles are quickly and easily computed.

The wrist position cannot be located when the wrist pitch angle is zero since the wrist roll link becomes parallel to the wrist yaw link and the cross-product is zero. Further, the convergence of the cross-product solution deteriorates as the wrist pitch angle approaches zero. It has been determined experimentally and by simulation that the convergence of the cross-product solution is slow in a band lying approximately between $+8$ and $-8$ degrees for the wrist pitch angle. This band is called a singularity band.

In order to maintain positional accuracy and smooth motion of the robot arm, based on the existing value of the wrist pitch angle, two different solutions are used for the singularity problem. When the wrist pitch angle is outside the singularity band the cross-product solution or dot-product solution is employed. When the wrist pitch angle is within the singularity band, a different method, referred to as a singularity method, is employed to obtain exact position and approximate orientation.

Two schemes for the singularity method are employed. The first scheme is used when the values for the last three joints of the target point are known (e.g., programmed linear motion). The second scheme is used when these values are not known (e.g., linear jog). Upon detection of the singularity band, interpolated values for the wrist roll, wrist pitch, and wrist yaw angles are used with the end effector position to determine the remaining three joint angles. In the programmed linear motion method, this procedure is repeated until the target point is reached. In the linear jog method, this procedure is repeated until the wrist pitch angle is outside the singularity band. Upon exiting the singularity band, the values of the joint angles are used to compute the rotation matrix at the faceplate of the robot arm. This actual faceplate rotation matrix replaces the current faceplate rotation matrix as used by the higher level motion processing modules of the robot arm motion program. This insures a smooth transition out of the singularity band while any further rotational changes would be applied to the actual rotation matrix.

The computation of the joint angles is in a program processing module of the motion processing system for the robot manipulator. Commands from the robot console under programmed control, or commands from the robot teach pendant under operator control are interpreted by a robot motion command interpreter and sent to the motion processing system. The motion processing controls the generation of the joint angles by executing the reverse transformation program module. The computed joint angles are then used by a motion command program module to activate movement in the robot joint motors. The robot joint motors rotate the corresponding joint about its axis of rotation. In this manner, the robot manipulator is posed in its new position.

DESCRIPTION OF ILLUSTRATIVE EMBODIMENT

A.

General Description of Offset Wrist Robot Manipulator

Figure 1:
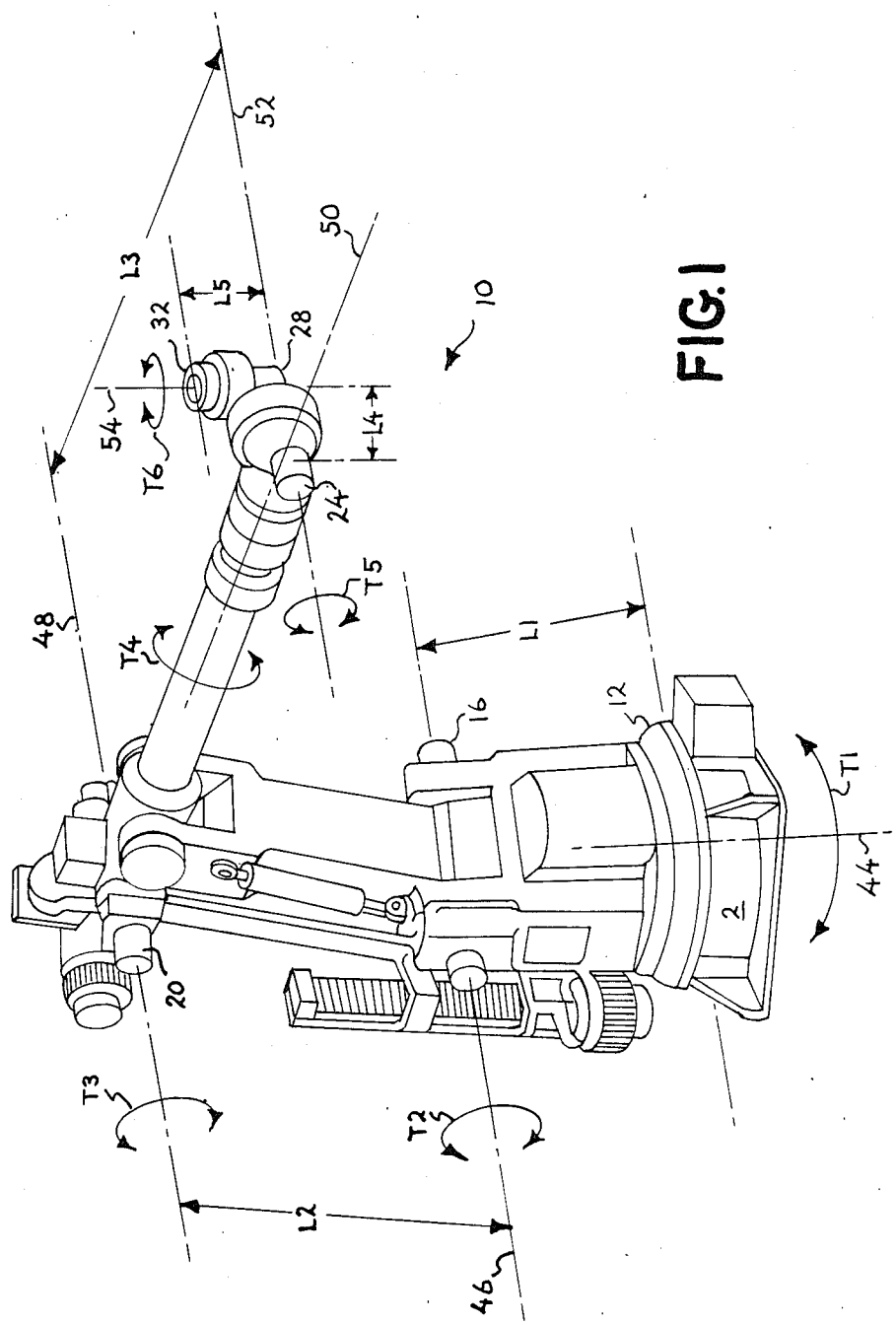
FIG. 1 is a perspective view of a robot manipulator with an offset wrist.

FIG. 1 is a perspective view of a robot manipulator arm 10 with an offset wrist 24. The illustrated robot manipulator 10 is comprised of a base 12, a shoulder 16, an elbow 20, a wrist 24, a knuckle 28 and a faceplate 32. The faceplate 32 allows an end effector (not shown) such as a welding tip to be secured to the faceplate 32 for the robot manipulator arm 10 to move and control. The base 12 rotates about its axis 44 perpendicular to the mounting plate 2. The rotation angle T1 is commonly called the base joint angle. The base joint rotation angle is normally constrainted by physical limitation in a robot manipulator. For example, the base rotation is limited to +135 degrees to −135 degrees in a GP110 robot manipulator available from General Electric Company.

The base 12 is connected to the shoulder 16 by a rigid link L1. This link and all the rest remain a constant length and do not change lengths during the operation of the robot manipulator. The shoulder 16 rotates about its axis 46, which is perpendicular to the base 12 axis of rotation 44. The rotation angle T2 of the shoulder 16 cannot, due to physical constraints, move 360 degrees. In the GP110, T2 can move from +20 degrees to −45 degrees. The shoulder 16 rotation angle T2 is commonly called the shoulder joint angle. The shoulder 16 is connected to the elbow 20 by another rigid link L2. The axis of rotation 47 of the elbow 20 is parallel to the axis of rotation 46 of the shoulder 16. Also the elbow joint angle T3 is constrainted by physcial limitations. In the GP110, T3 can move from +45 degrees to −45 degrees.

The elbow is connected by a ridig link L3 to the wrist 24. The wrist roll axis of rotation 50 is perpendicular to the elbow axis of rotation 48. The wrist roll can rotate 360 degrees about link L3 and this angle of rotation is commonly called the wrist roll angle T4. In an offset wrist manipulator the wrist 24 is not at the intersection of the three wrist rotation axes 50, 52, 54 as in a spherical wrist manipulator. The offset, known as the knuckle 28, is connected to the wrist by link L4. The axis of rotation 52 is perpendicular to the axis of rotation 50 for the wrist roll. The axis of rotation 52 about the knuckle is referred to as the wrist pitch axis. The angle of rotation T5 about axis 52 is the wrist pitch angle, and it can rotate 360 degrees. The knuckle 28 is connected to the faceplate 32 by link L5. The axis of rotation 54 for the faceplate 32 is commonly called the wrist yaw axis. The angle of rotation T6 about the axis 54 is called the wrist yaw angle, it is the last of the joint angles T1 through T6 and can also rotate 360 degrees. The end effector (not shown in FIG. 1) is an end effector that is secured to the faceplate by bolting or other fastening method. The axis of rotation 54 of the faceplate 32 is equivalent to an axis of rotation of the end effector, i.e., knowing the orientation and position of the end effector is equivalent to knowing the orientation and position of the faceplate.

The cross-product and dot-product methods are based upon the geometry, just described, for the robot manipulator. For the cross-product method, the wrist pitch vector is equal to the cross-product of the wrist roll vector and the wrist yaw vector. However, when T5 is equal to zero, the cross-product is zero and a singularity occurs in the mathematics. Thus the joint angles cannot be found by this method and other alternative methods must be used. These methods are described later as solutions to the singularity problem.

For the dot-product method, the same singularity occurs when T5 is equal to zero. Thus, the singularity methods are alternatively used with the cross-product method or dot-product method. The best results, from experimentation and simulation, have found that when the wrist angle T5 is approximately less than 8 degrees or greater than −8 degrees, that the alternative singularity methods should be used to compute the joint angles.

Once the joint angles are computed, commands are generated by the microprocessor and sent to an actuator to move each joint. The actuator may be hydraulic or electric depending upon the use of the particular manipulator. For instance if the robot manipulator arm is to move only one degree about axis 44, the base rotation axis, a command to move the base joint will be sent to the base joint actuator to move the base one degree.

Figure 2:
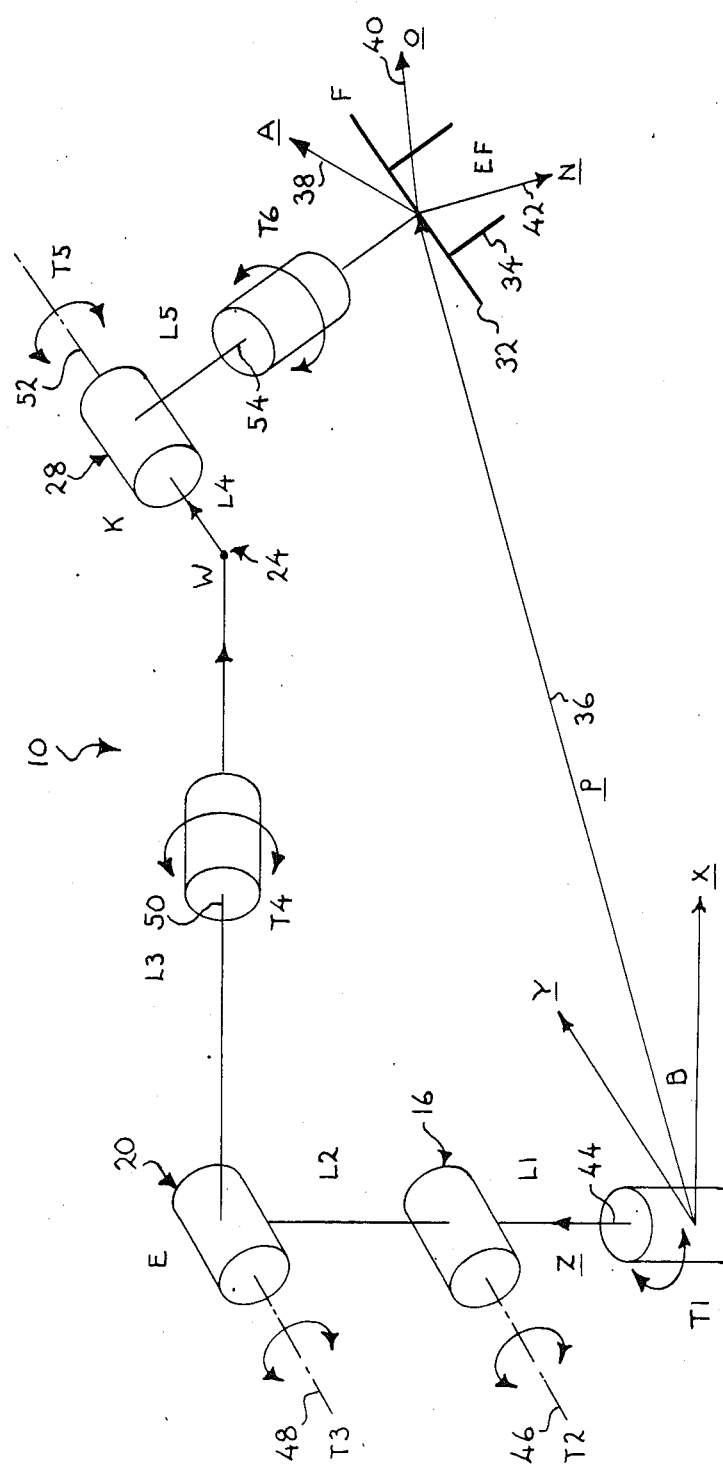
FIG. 2 illustrates the coordinate systems for the component parts of a robot manipulator with an off-set wrist.

FIG. 2 illustrates only the coordinates of an articulated robot manipulator with an off-set wrist. The detailed structure of the robot arm is not important to the present application. The important features are the coordinate system of the robot arm.

The illustrated robot arm 10 is comprised of a plurality of serial connected links each joined by a rotary axis. The x, y, z origin of the world rectangular coordinate system is located at the axis of rotation of the base 12. T1 is the angle of rotation about the base 12. Shoulder 16 is connected to base 12 by link L1. T2 is the shoulder 16 rotation angle. Elbow 20 is connected to shoulder 16 by link L2. T3 is the elbow 20 rotation angle. Wrist 24 is connected to elbow 20 by link L3. T4 is the wrist 24 roll angle. Knuckle 28 is connected to wrist 24 by link L4. T5 is the wrist 24 pitch angle. Faceplate 32 is connected to knuckle 28 by link L5. T6 is the wrist 24 yaw angle. T1 through T6 are known as the joint angles. The end effector 34 is secured to the faceplate 32.

Referring to FIG. 2, p represents a position vector (px, py, pz) of the faceplate position and n, o and a are three orthogonal unit vectors that represent the desired rotation matrix of the faceplate. For purposes of discussion, vectors will be indicated by underlining.

B.
Derivation of the Cross-Product Method

For the robot arm 10 of FIG. 2, the faceplate position and orientation F can be expressed as a 4×4 homogeneous matrix as follows:

$$\begin{matrix} nx & ox & ax & px \\ ny & oy & ay & py \\ nz & oz & az & pz \\ 0 & 0 & 0 & 1 \end{matrix} \quad (1)$$

Where $N=(nx, ny, nz)$, $O=(ox, oy, oz)$, and $A=(ax, ay, az)$ are the three orthogonal unit vectors of the rotation matrix; and $P=(px, py, pz)$ is the position vector in the world coordinates of $(x, y, z)$. The knuckle 28 position, K, is obtained from P and A by:

$$PK = P - L5 * A \quad (2)$$

where $PK=(pkx, pky, pkz)$ is the knuckle position vector. As will be apparent, the vector components along the x, y and z axes are indicated by a non-capitalized letter or letters followed by either x, y or z rather than by use of the standard sub-script method of indicated components.

It is evident that the wrist 24 can not be placed with the given faceplate information since the wrist pitch vector is unknown. An iterative procedure is therefore required to solve for the joint angles (T1,T2,T3,T4,T5,T6). The following steps are used to solve for T1 through T6 in the cross-product method.

1. Determne the Knuckle Position

The first step is to determine the knuckle coordinates (pkx, pky, pkz) from equation (2). The iterative procedure is started with the wrist position vector PW equal to the knuckle position vector PK.

$$\begin{matrix} pwx \\ pwx \\ pwz \end{matrix} = \begin{matrix} pkx \\ pky \\ pkz \end{matrix} \quad (3)$$

2. Determine the vector along Link L3

Figure 3:
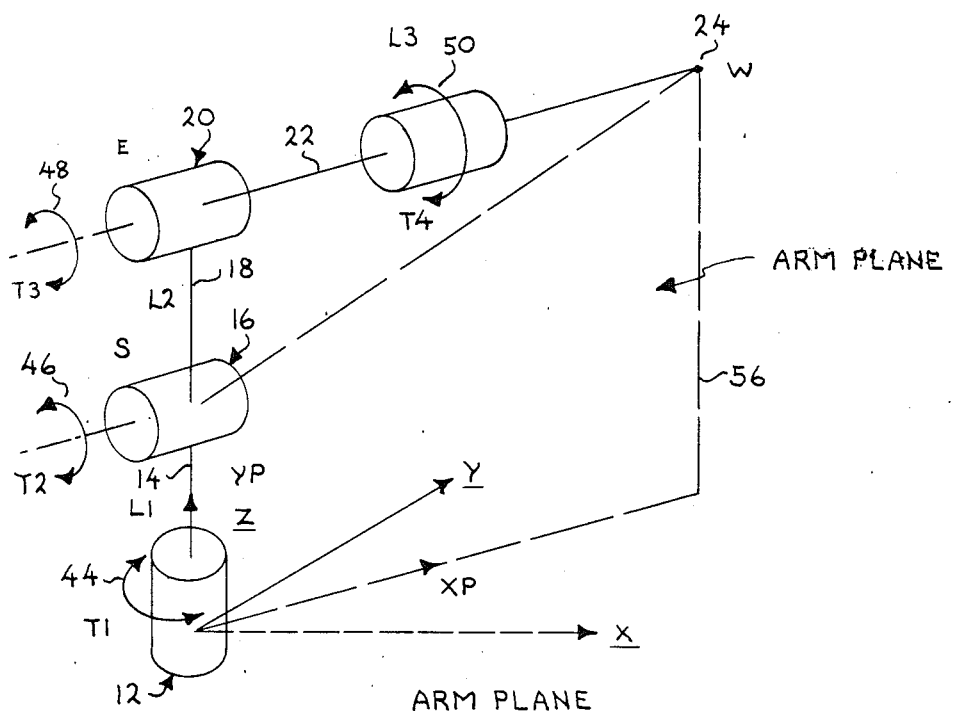
FIG. 3 is a view illustrating an arm plate defined in the plane formed by the first three links.

With the wrist position vector $PW=(pwx, pwy, pwz)$ from step 1, the wrist roll vector is determined. Note that the first three links of robot 10 (L1,L2 and L3) are always coplanar. Referring to FIG. 3, it is easier to work in a coordinate frame defined in the plane formed by the first three links. xp, yp denote the x-axis and the y-axis in the L1,L2,L3 arm plane 56. Note that yp is the same as the z-axis of the base or world coordinate frame shown in FIG. 2.

Let (xpw,ypw) denote the wrist coordinates in the arm plane 56 as shown in FIG. 3.

$$ypw = pwz \quad (4)$$

$$xpw = (pwx^2 + pwy^2)^{\frac{1}{2}} \quad (5)$$

Initially the coordinates of the elbow 20(E) in the planar coordinate frame are determined, (formed by xp and yp, in FIG. 3). The coordinates of the shoulder 16(S) in the planar frame are (0, L1). SW equals the distance between the shoulder 16 and the wrist 24. Thus, $$SW = (xpw^2 + (zpw - L1)^2)^{\frac{1}{2}} \quad (6)$$

Figure 4:
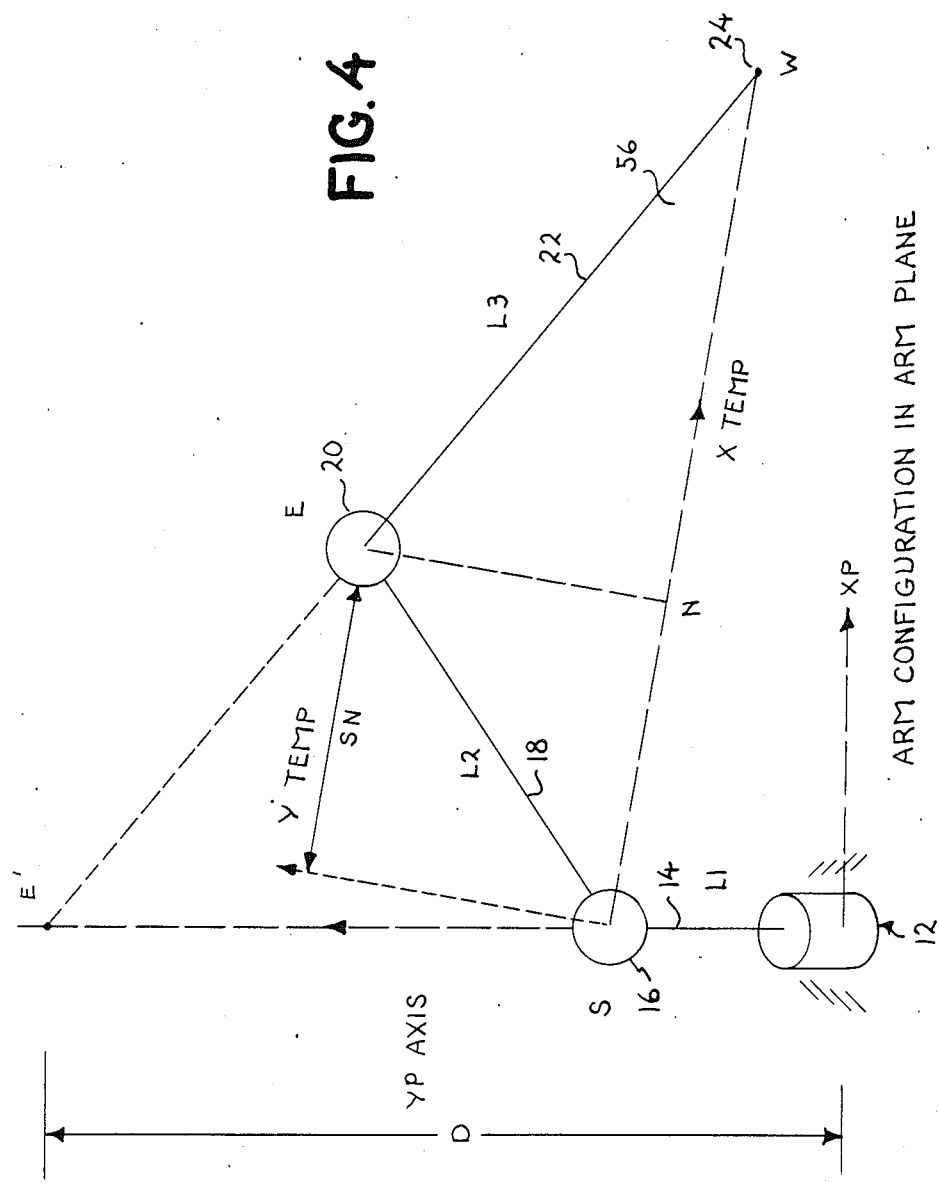
FIG. 4 shows the arm configuration in the arm plane.

Referring to FIG. 4, there is shown the arm configuration in the arm plane 56, and illustrates the variables used in the determination of the elbow coordinates. From FIG. 4, $$SN + NW = SW \quad (7)$$

Also, $$SN^2 + EN^2 = L2^2 \quad (8)$$

$$NW^2 + EN^2 = L3^2 \quad (9)$$

From equations (8) and (9), $$SN^2 - NW^2 = L2^2 - L3^2 \quad (10)$$

$$(SN - NW) = \frac{L2^2 - L3^2}{SW}$$

From equations (7) and (10), $$SN = 0.5 \left( SW + \frac{L2^2 - L3^2}{SW} \right) \quad (11)$$

From equation (8), $$EN = L2^2 - SN^2 \quad (12)$$

From FIG. 4, the coordinates of the elbow 20(E) in a temporary coordinate frame (formed by xtemp, ytemp) are (SN, EN) where SN and EN are given by equations (11) and (12) respectively.

Since the coordinate of W 24 in the frame of (xtemp, ytemp) and the coordinates of W in the frame of (xp, yp) are known, we can transform (SN, EN) to the xp, yp frame as:

$$xpe = -\frac{ypw * EN}{SW} + \frac{xpw}{SW} * SN \quad (13)$$

or $$xpe = \frac{xpw * SN - ypw * EN}{SW}$$

Similarly, $$ype = L1 + \frac{(xpw*EN + ypw*SN)}{SW} \quad (14)$$

where (xpe, ype) are the coordinates of elbow 20 in the planar frame formed by xp and yp.

Referring to FIG. 4, let D denote the y-intercept of the EW line on the yp-axis. The equation to the 'EW' line in the plane is:

$$y = \left[ \frac{ypw - ype}{xpw - xpe} \right] x + D \quad (15)$$

$$D = -\left[ \frac{(ypw - ype)}{(xpw - xpe)} \right] xpw + ypw \quad (16)$$

In world or base coordinates, the vector EW is given by subtracting the coordinates of point E(O, O, D) from the coordinates of W.

$$EW = \begin{matrix} xw \\ yw \\ D - zw \end{matrix} \quad (17)$$

Since pwz=ypw, $$EW = \begin{matrix} xw \\ yw \\ \frac{xpw \, (ype - pwz)}{(xpw - xpe)} \end{matrix} \quad (18)$$

where xpw is given by equation (5), xpe by equation (13), ype by equation (14) and pwz from equation (3).

3. Estimate the WK vector

The next step is to determine the first approximation to the vector WK.

$$WK = (EW \times KE) \text{ unit} \quad (19)$$

where x denotes the vector cross product and "unit" is the vector unitization operation.

4. Calculate a New Wrist Position

With the estimate of WK vector given by equation (19), determine a new wrist position as follows:

$$\begin{matrix} pxw \\ pyw \\ pzw \end{matrix} = \begin{matrix} pxk \\ pyk \\ pzk \end{matrix} - L4 * WK \quad (20)$$

5. Determine Improvement in Wrist Position

With the new wrist position from equation 20, a new iteration starting with equation (4) is executed. The iterations are continued until the magnitude of the vector difference between two sequential wrist positions becomes negligibly small (less than 0.0001 meter). Thus, the wrist position is found by repeating steps 2 through step 4 until there is minimal improvement in the wrist position from the previously calculated wrist position.

6. Solve for Remaining Joint Angles

The first three joint angles follow immediately once the wrist position coordinates are found. From equation (20):

$$T1 = \text{Arctan } (pwy, pwx) \quad (21)$$

$$T2 = \text{Arctan } (xpe, ype-L1) \quad (22)$$

$$T3 = \text{Arctan } (ypw-ype, xpw-xpe) \quad (23)$$

For T4:

$$\sin (T4) = \sin (T1) \, pwx - \cos (T1) \, pwy \quad (24)$$

$$\cos (T4) = - (\cos (T1) \sin (T3) \, pwx) -$$

$$(\sin (T1) \sin (T3) \, pwy + \cos (T3) \, pwz)$$

$$T4 = \text{Arctan } (\sin (T4), \cos (T4))$$

For T5:

$$(T5) = (-\sin (T1) \cos (T4) - \cos (T1) \sin (T3) \sin (T4)) \, ax + \quad (25)$$

$$(\cos (T1) \cos (T4) - \sin (T1) \sin (T3) \sin (T4)) \, ay + \cos (T3) \sin (T4) \, az$$

$$\cos (T5) = \cos (T1) \cos (T3) \, az + \sin (T1) \cos (T3) \, ay + \sin (T3) \, az$$

$$T5 = \text{Arctan } (\sin (T5), \cos (T5))$$

For T6:

$$\sin (T6) = (pwx) \, az + (pwy) \, ay + (pwz) \, az \quad (26)$$

$$\cos (T6) = (pwx) \, nx - (pwy) \, ny - (pwz) \, nz$$

$$T6 = \text{Arctan } (\sin (T6), \cos (T6))$$

These joint angles are then generated into command signals for each corresponding joint motor by the motion command processing module. The joint motors are then activiated and the arm is posed in the new position.

7. Flow Diagram for Cross-Product Method

Figure 5:
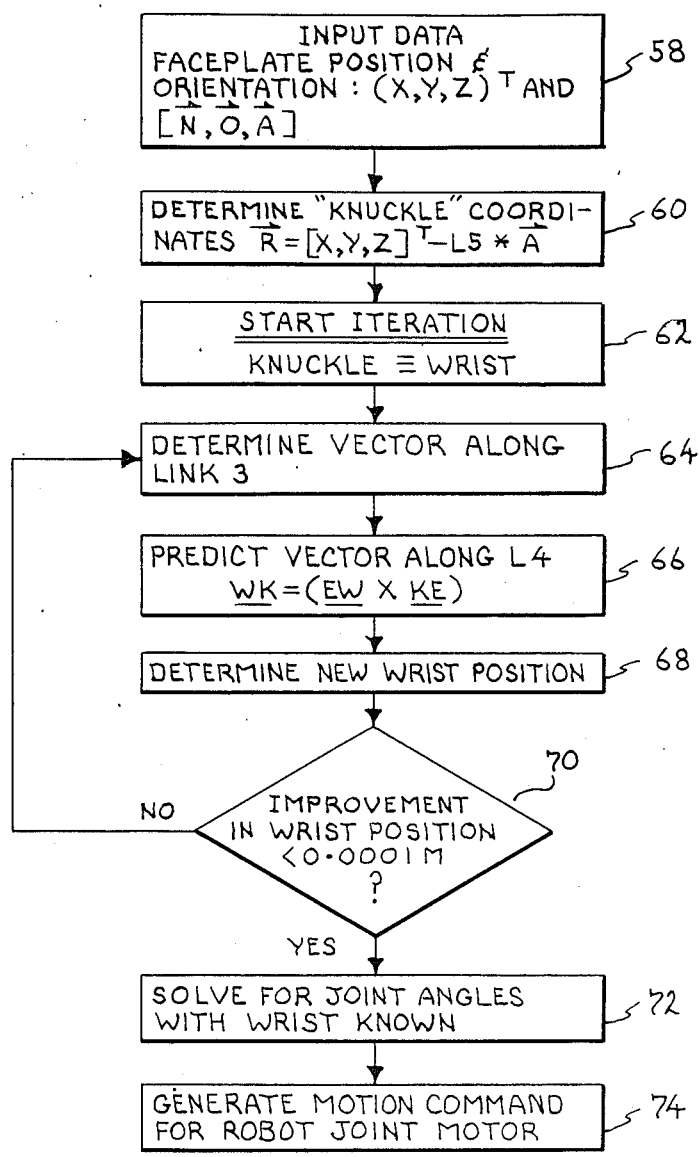
FIG. 5 is a block diagram of the cross-product method.

Referring to FIG. 5, there is shown a flow diagram representing the sequence of steps in the cross-product method. For the robot arm the faceplate position and orientation are known values block 58. From these values the knuckle coordinates are determined block 60. The start of the method begins with the wrist coordinates equal to the knuckle coordinates block 62. In block 64, the vector along link L3 is determined. Then the cross-product of $WK = (EW \times KW)$ is estimated in block 66. With this estimate of WK a new wrist position is determined in block 68. The change in the new wrist position from the previous wrist position is calculated. In block 70 it is determined if the change or improvement is less than 0.0001 meters, if the improvement in wrist position is not less than 0.0001 meters, then the method is repeated starting at block 64. If the answer to block 70 is yes, then the rest of the joint angles (T1,T2,T3,T4,T5) are determined, represented by block 72. Finally the motion command for the servo motors are generated in block 74 from the new joint angles and the robot arm is posed in a new position. The procedure starts over again when a new position for the end effector is desired.

C.

Derivation of the Joint Angles by the Dot-Product Method

1. Derivation of Dot-Product Method

Figure 6:
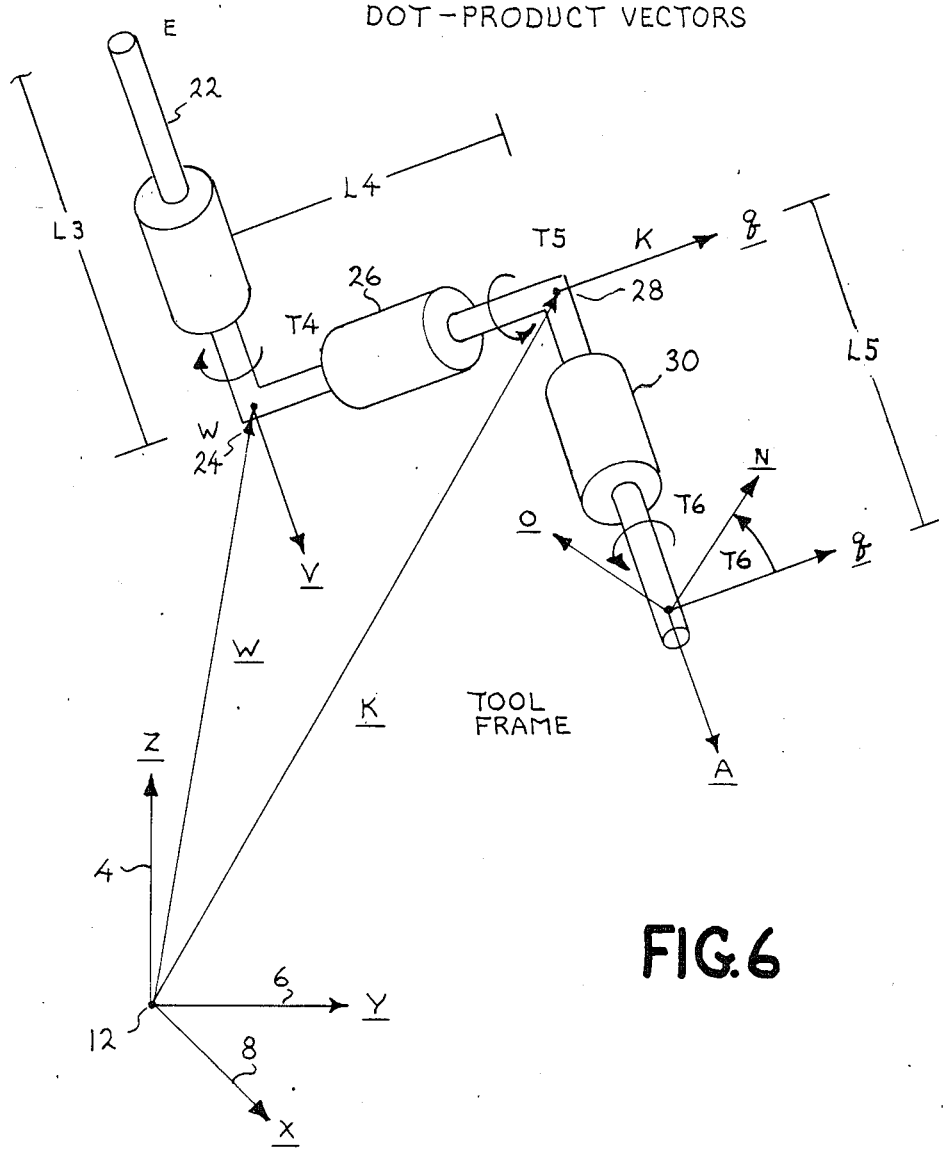
FIG. 6 shows the spatial relationships of the vectors employed in the dot-product method.

The dot-product solution is similar to the cross-product solution in that the wrist is again located from the geometry of the last three robot links (L3,L4,L5). Referring to FIG. 6, the dot-product solution determines T6 and the wrist position. Once the wrist position is known the other joint angles can be calculated using equations 22 through 26.

Since L5 is perpendicular to L4 the link L4 must lie in the faceplate y-z plane defined by the faceplate orientation vectors n and o. If the direction of link L4 can be determined, then the wrist position becomes known and the solution to all the other angles can be computed directly. Knowing the direction of link L4 amounts to knowing T6, which, of course, is unknown. This situation is depicted in FIG. 6 where the direction of L4 is indicated by the unit vector WK:

$$WK = \cos (T6)^* ny - \sin (T6)^* oz \quad (27)$$

Since T6 is unknown, a function is required which will give an estimate T6. From the arm geometry a function can be developed by noting that link L4 must always be orthogonal to L3, regardless of the arm configuration. This constraint, translated into vector terms, means that the dot product of the unit vector WK along the direction of L4 and the vector EW, defined to be in the direction of link L3, must be 0:

$$EW \cdot WK = 0 \tag{28}$$

Any choice of T6 that satisfied equation (28) will be a feasible solution to the reverse kinematic problem, provided that the vector EW is determined by WK. In other words, given WK as the current estimate in the direction of L4, what is the current estimate EW in the direction of L32? With an estimate of the wrist position, the vector EW is determined by equation (18), as described in the derivation of the cross-product method.

If the dot-product in equation (28) equals zero for a particular choice of T6, then a solution to the robot arm 10 has been found with T6 equal to that choice. Once T6 is known the other joint angles T1,T2,T3,T4 and T5 can be computed. However, it may be that the dot product EW·WK is not equal to zero. This occurs when the choice of T6 used to calculate equation (27) is not correct. The problem reduces to finding the value of T6 which satisfies equation (27) with the constraint that $EW \cdot WK = 0$. The solution to this problem can be solved by finding the roots of the function $$U(T6) = EW \cdot WK = 0 \tag{29}$$

Solving $U(T6) = 0$ produces a valid value for T6.

In the range of GP110 manipulator operation, U(T6) has been observed to have at most two roots. The two roots are called "wrist left" and "wrist right" solutions. Note that in the cross-product method described in the previous section, the second solution can be determined by reversing the cross-product, or, $$WK = (KE \times EW) \text{ unit} \tag{30}$$

2. Iterative procedure for dot-product method

A. Step one for dot-product method

Step one is to compute U (T6=0) and U(T6=180). If U (0) and U (180) do not have the same sign, a root of U(T6) lies in the interval [0,180], i.e., between 0 and 180 degrees. Then the well known Newton-Raphson technique is used to iterate on T6 to find the root to the desired accuracy.

B. Step two for dot-product method

If the signs of U(0) and U(180) are equal, either there is one distinct root of multiplicity two or two roots in the interval [0, 180] or there is no feasible solution.

C. Step three for dot-product method

Step 3 assumes there is at least one root. First, determine U(T6) equal to the minimum value in the interval of [U(0), U(180)] and then compute another value of U(T6) near the smaller value, U(T6+Delta), where Delta is arbitrarily chosen to be a small positive value. If U(T6+Delta)=U(T6), the root(s) most likely will be in the interval [T6,T6+180]. Again an iteration procedure using the Newton-Raphson technique finds a root or a local minimum in the interval. If a root is found, it is tested for multiplicity two by checking the sign of U(T6) on both sides of the root. If U(T6) crosses the axis, a second root is obtained in the same manner as in step one. In the case of a local minimum the interval [T6−180,T6] is searched for the root(s). If this too fails, then there is no feasible solution and the method proceeds to step four.

D. Step four for dot-product method

Step 4 returns a value of T6 that yields a possible minimum of U(T6) on the interval [0, 360], if that minimum value of U(T6) is as small as 0.0001. In all likelihood this possible minimum is a global minimum. If U(T6) is not small enough, no solution can be determined, and the dot-product method terminates indicating a possible problem.

E. Step five for dot-product method

Steps one through four yield two values of T6. The value of T6 that is used depends upon if the wrist of the manipulator is in a wrist left or wrist right configuration. This configuration is determined from the previous pose of the manipulator arm and updated each time a new T6 is computed. Thus, depending upon the previous configuration, one value for T6 will be the correct value. Step five determines the rest of the joint angles (T1,T2,T3,T4,T5). They are calculated from equations (21)–(25) as described in the cross-product method.

F. Step 6 for Dot Product Method

Once the joint angles (T1,T2,T3,T4,T5,T6) are found, a motion command is sent to each robot joint motor corresponding to the respective joint angle. For instance, T1 is sent to the robot joint motor for the base, to rotate the base to the appropriate position. Likewise, the other robot joint motors are energized to pose the robot arm 10 in the correct position. The procedure is then repeated again for a new arm pose.

3. Flow Diagram for Dot-Product Method

Figure 8:
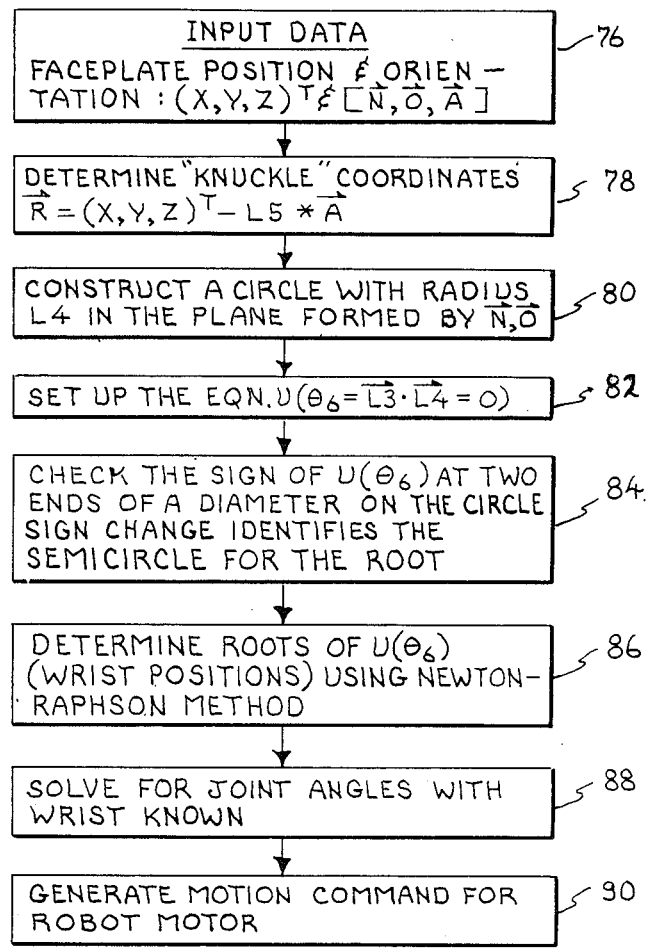
FIG. 8 is a block diagram of the dot-product method.

Referring to FIG. 8, there is shown the flow diagram for the dot-product method. Starting with block 76, the faceplate orientation and position is known, because it is known where the end effector is located. From the known faceplate position and orientation the knuckle coordinates are determined by equation, block 78. Since the vector L5 is known, the wrist must lie on a plane perpendicular to L5 and on a circle with the knucklepoint as the center and radius equal to L4. Block 80 represents computing the equation of this circle. Once the equation of the circle in the plane perpendicular to L5 is formulated, the wrist coordinates are located such that the dot-product function U(T6) of the radius vector (link L4) and the vector L3 is zero, block 82. The problem then is to determine the solution to the equation U(T6)=0, where U is a function of T6. This is done by solving U(T6) with the present value of T6. If U(T6)=0, the T6 is changed and U(T6) recalculated until U(T6)=0. Since the function has changed signs, a value of T6 must exist in the interval, where U(T6)=0. This is shown by block 84. Since, the interval where U(T6)=0 is known, the exact value of T6 is calculated using a well known numerical iteration technique, such as the Newton-Raphson method, block 86. There are two solutions to U(T6), depending on if the wrist is to the left (wrist left) or to the right (wrist right) of the end effector. Since the previous pose of the arm is known, it is a very simple matter of just remembering if the wrist is in a wrist left or a wrist right configuration. Thus, only one solution is determined for the present configuration. Knowing the unique exact value for T6, the rest of the joint angles are computed, block 88. The joint angles are then converted to motion commands for each joint motor and the arm is posed in its new position, block 90.

D.

The Singularity

1. The Singularity Band

Figure 7:
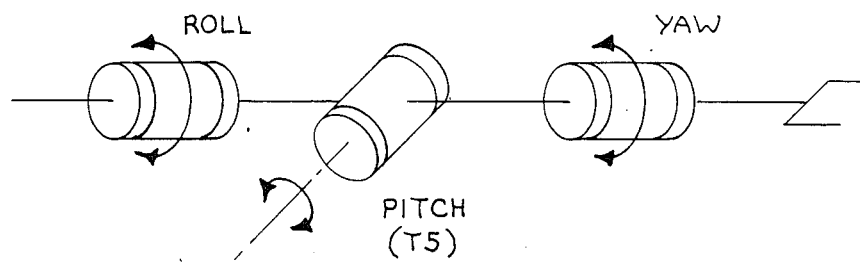
FIG. 7 illustrates the singularity problem for a spherical wrist manipulator.

When T5 (wrist pitch rotation angle) approaches its zero value, the convergence of the cross-product method and dot-product method becomes slower. This problem can be traced to a mathematical singularity in the proposed solution for all robot arm 10 configurations when T5 is at zero degrees. Since the singularity causes a slower convergence of the reverse solution, a band around the wrist pitch axis (whenever $8° \geq T5 \geq -8°$) is identified as the "singularity band", and two singularity methods are used to maintain positioned accuracy and smooth motion of the robot arm. The first method (programmed linear motion method) is used when the values for the last three joint angles (T4,T5,T6) of the target point are known, under programmed linear motion control. The target point is a desired point in space which is known. The second method, (linear jog method), is used when the values for the last three joint angles of the target point are not known, under linear jog control. As stated before, when T5 is greater than 8 degrees or less than $-8$ degrees, the cross-product method or dot-product method is employed. Once T5 is within the $+8$, $-8$ degrees band, either the programmed linear motion method or linear jog method is employed. The singularity methods described herein for the offset wrist manipulator, are equally applicable to any manipulator with a singularity in the wrist. This includes the spherical wrist manipulator, where the wrist singularity occurs when the pitch rotation is zero, and the roll and yaw axes line up. The roll and the yaw become the same rotation, as shown in FIG. 7, and there are theoretically infinite ways of positioning the roll and yaw axes (infinite solutions to the roll and yaw joint angles) to result in the same end effector orientation. The singularity band for each manipulator may be defined by the region around the pitch axis where the reverse solution begins to degenerate. For example, the singularity band for the General Electric robot model P60, which is a spherical wrist manipulator, has been determined as 1 degree $\geq = T5 \geq = -1$ degree.

2. Programmed Linear Motion Method

Upon detection of the singularity band, indicated by the absolute value of T5 less than 8 degrees, and since the target point values for the last three joint angles are known, the following equations are used to compute the interpolated values for T4,T5 and T6.

$$T4_{i+1} = T4_i + (T4_{target} - T4_i)*(UP/TR) \quad (31)$$

$$T5_{i+1} = T5_i + (T5_{target} - T5_i)*(UP/TR) \quad (32)$$

$$T6_{i+1} = T6_i + (T6_{target} - T6_i)*(UP/TR) \quad (33)$$

where $i+1$ is the new joint angle value; i is the present joint angle value; target is the target value of the joint angle; UP is the update period or sampling period at which the method is used; and TR is the amount of time remaining in which the robot arm is to reach the desired target point.

The new values of T4, T5 and T6 together with the desired end effector position but no orientation are used to determine T1, T2 and T3. Computing T1, T2 and T3 is rather straight forward, and well known in the art.

Equations for the Determination of T1, T2, and T3 in Singularity:

Note: c1 refers to cosine (T1), c3 refers to cosine (T3), etc., and s1 refers to sine (T1), s3 refers to sine (T3), etc.

Let $p=(px, py, pz)$ be the position vector of the end effector in the world coordinates of $(x, y, z)$. The three equations in three unknowns (T1, T2, T3) are as follows:

$$px = [c1c3c5 - (s1c4 + c1s3s4)s5]L5 + (s1s4 - c1s3c4)\cdot L4 + c1(L3c3 + s2L2) \quad (34)$$

$$py = [s1c3 + (c1c4 - s1s3s4)s5]L5 - (c1s4 + s1c4s3)L4 + s1(L3c3 + s2L2) \quad (35)$$

$$pz = (s3c5 + s4c3s5)L5 + c4c3L4 + L3s3 + c2L2 + L1 \quad (36)$$

Note that px, py, pz are functions of T1, T2, T3, T4, T5, T6. Since T4, T5 and T6 are already known, the determination of T1, T2 and T3 from the equations, (1), (2) and (3) are as follows:

Algebraic manipulations of equations (1), (2) and (3) yields, $$T1 = \text{Arctan } 2(py, px) - \text{Arctan } 2(\alpha, (px^2 + py^2 - \alpha^2)^2 \quad (37)$$

where $\alpha = c4s5L5 - s4L4$

Two sets of equations can be derived for T2 and T3. One set applies when the absolute value (abs) of $(T1) \geq 0$. The other set applies when $T1 = 0$.

Thus, if abs $(T1) \geq 0$, then T2, T3 are determined as follows:

Define the following temporary variables M0, M1, M2, M3, M4, M5, M6 as:

$$M0 = s4\ s5\ L5 + c4\ L4$$

$$M1 = L3 + c5\ L5$$

$$M2 = pz - L1$$

$$M3 = \frac{-py + c1\ (c4\ s5\ L5 - s4\ L4)}{s1}$$

$$M4 = 2 * (M1\ M2 + M0\ M3)$$

$$M5 = 2 * (M1\ M3 - M0\ M2)$$

$$M6 = L2^2 - [M1^2 + M2^2 + M3^2 + M0^2]$$

$$\text{root} = (M4 + M5 + M6)^2$$

$$T3 = \text{Arctan } 2\ (M5, M4) - \text{Arctan } 2\ (M6, \text{root}) \quad (38)$$

$$T2 = \text{Arctan } 2\ ((M0\ s3 - M1\ c3 - M3)/L2, \quad (39)$$

$$(M2 - M1\ s3 - M0\ c3)/L2)$$

If $T1 = 0$ the T2, T3 are determined as follows:

Redefine M4, M5 and M6 as:

$$M4 = 2 * (M0\ px - M1\ M2)$$

$$M5 = 2 * (M1\ px + M0\ M2)$$

$$M6 = M2^2 + px^2 + M1^2 + M0^2 - L2^2$$

$$T3 = \text{Arctan } 2\ (M5, M4) - \text{Arctan } 2\ (M6, \text{root}) \quad (40)$$

$$T2 = \text{Arctan } 2\ [(M0\ s3 - M1\ c3 + px)/L2, \quad (41)$$

$$(M2 - M1\ s3 - M0\ c3)/L2]$$

Determining T1, T2 and T3 is a closed form solution of computing three simultaneous equations with three unknowns. The values of the joint angles are then fed to the robot joint motors to pose the arm. The iteration is repeated replacing each previous computed joint angle with the present computed joint angle until reaching the target point values.

This method continues until T5 is outside the singularity band, when the cross-product or dot-product method is employed. Upon exiting the singularity band, the values of the joint angles are used to compute the rotation matrix at the faceplate of the robot arm. This actual faceplate rotation matrix replaces the current faceplate rotation matrix. This ensures a smooth transition out of the singularity band, while any further rotational changes would be applied to the actual rotation matrix.

3. Linear Jog Method

When the target point values of the last three joint angles (T4,T5,T6) are not known, the following equations are used to compute the new values for T4, T5 and T6.

$$T4_{i+1} = T4_i - T4_{rate} \tag{42}$$

$$T5_{i+1} + T5_i - T5_{rate} \tag{43}$$

$$T6_{i+1} = T6_i - T6_{rate} \tag{44}$$

where $i+1$ is the new joint angle, and i is the present joint angle and $T4_{rate}$, $T5_{rate}$ and $T6_{rate}$ are computed from previous joint angles. $T4_{rate}$, $T5_{rate}$ and $T6_{rate}$ are calculated by:

$$T4_{rate} = T4_i - T4_{i-1} \tag{45}$$

$$T5_{rate} = T5_i - T5_{i-1} \tag{46}$$

$$T6_{rate} = T6_i - T6_{i-1} \tag{47}$$

where $i-1$ is the previous joint angle. The following substitutions are then used in the next cycle:

$$T4_i = T4_{i+1} \tag{48}$$

$$T5_i = T5_{i+1} \tag{49}$$

$$T6_i = T6_{i+1} \tag{50}$$

The interpolated values of T4, T5 and T6 together with the desired end effector tip position are used to determine the remaining three joint angles T1, T2, T3 as discussed previously in the programmed linear motion method. The values of the joint angles (T1,T2,T3,T4,T5,T6) are then transformed to motion commands to each robot joint motor. This method is continuously used until T5 is outside the singularity band, when as discussed before the cross-product or dot-product method is employed.

The values of the joint angles are used to compute the rotation matrix at the faceplate of the robot arm upon exiting the singularity band as discussed in the programmed linear motion method. This ensures a smooth transition out of the singularity band, while any rotational changes would be applied to the actual rotation matrix.

E. Flow Control For The Reverse Solution

Figure 9:
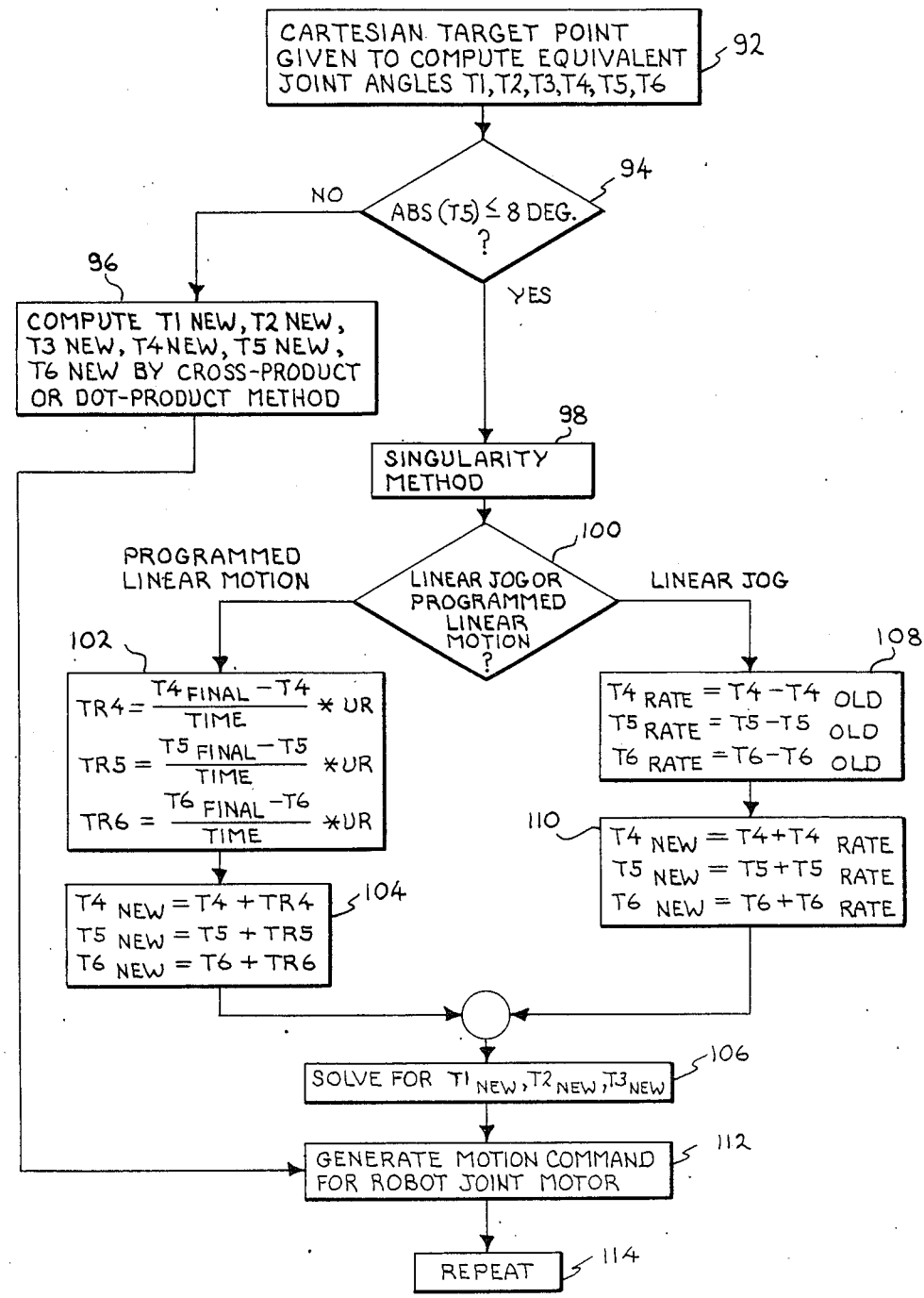
FIG. 9 is a flowchart for the total reverse solution.

Referring to FIG. 9, FIG. 9 is the flow control for the reverse transformation. Starting with the Cartesian target point, block 92, the equivalent joint angles are determined to generate motion commands for the robot joint motors, as shown in block 112. The first step in the method is to determine if T5 is in the singularity band, block 94. The singularity band is defined when the wrist pitch angle T5 is less than 8 degrees or greater than −8 degrees. If T5 is in the singularity band the dot-product or cross-product methods do not converge fast enough for real-time operations and an alternative method must be used. In fact, when T5 equals zero no solution for the dot-product or cross-product exists. If T5 is outside the singularity band the cross-product or dot-product method is used to determine the new equivalent joint angles T1,T2,T3,T4,T5,T6, block 96. Note that the cross-product or dot-product method is used unless the singularity band is reached. After T1,T2,T3,T4,T5, and T6 are calculated, the motion commands are generated to move the arm, block 112.

Once inside the singularity band, one of the singularity methods is used, block 98. The first determination in this method is whether the robot is operating under a linear jog or a programmed linear motion, block 100. Linear jog is used when the robot arm operator positions the robot arm with small increments in each joint angle, commonly called jogging. This method is used when the operator uses a teach pendant to teach the robot arm how to move. If the robot is under the linear jog method, referring to block 108, for T4,T5 and T6 a constant change is computed called respectively $T4_{rate}$, $T5_{rate}$ and $T6_{rate}$. These changes are added to the present value of each joint angle T4,T5 and T6 to calculate a new joint angle, block 110. The new joint angles T4, T5 and T6 are used to compute T1,T2 and T3, block 106. Since after computing T4, T5 and T6, three equations in three unknowns (T1,T2,T3) are left, T1, T2 and T3 are easily computed. The joint angles (T1,T2,T3,T4,T5,T6) are then used to generate a motion command for each robot joint motor, block 112.

The robot is normally operating under programmed linear motion, which is controlled by the microprocessor. Under programmed linear motion, when the singularity band is reached, the final position of the arm is known. For instance, under programmed linear motion the initial wrist roll angle is known, upon exiting the singularity band the microprocessor knows what should be the final value of the wrist roll angle. Thus, an interpolation method is used, block 102. Referring to block 102, the time remaining (Time), in which the arm is to reach the desired final point (target point), and the sampling period (UR) at which the reverse transformation is used are known. Thus, the change for T4, T5 and T6 can be computed, block 102. Referring to block 104, the change for T4, T5 and T6 are added to the present values of T4, T5 and T6 to calculate respectively a new T4, T5 and T6. Just as in the linear jog method, T1,T2 and T3 are then computed, block 106.

From the new values of T1,T2,T3,T4,T5 and T6 motion commands are generated for each joint motor, block 112. The reverse transformation method is then repeated beginning with block 92 to compute a new pose for the robot manipulator arm.

F.

Motion Of The Robot End Effector

The object of any robot arm is to move the end effector. This section illustrates how the reverse transformation is used to move the end effector.

Figure 10:
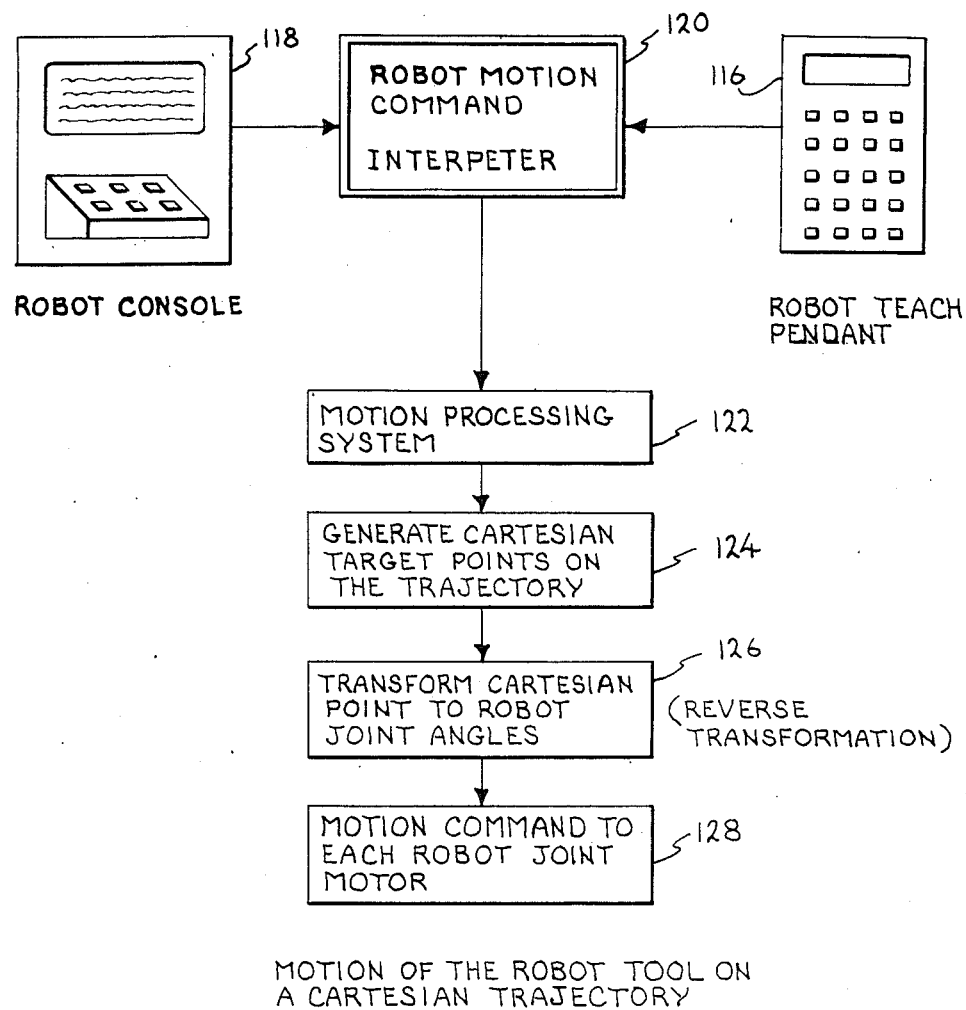
FIG. 10 is a block diagram showing the motion of a robot end effector on a Cartesian trajectory.

Referring to FIG. 10, there is shown the motion of the robot end effector on a Cartesian trajectory using the reverse transformation. Commands from the robot console 118, under programmed motion, or operator commands from the robot teach pendant 116, under linear jog motion, are interpreted for the robot processing system 122 by the robot motion command interpreter. The motion processing system is responsible for processing the interpreted commands from the robot motion command interpreter. The motion processing system controls the processing flow of the command. The motion processing system 122 must first generate the Cartesian target points on the end effector trajectory. The trajectory could be a straight line or any curve. In the simple case of moving the robot end effector in a straight line, the end effector position and orientation can be interpolated along the straight line to determine as many intermediate points as desired. Referring to block 124, block 124 illustrates generating these Cartesian target points.

In order to move the robot arm, the Cartesian points must be transformed to the equivalent joint angles, block 126. This is the reverse transformation which includes the cross-product method or dot-product method and the two singularity methods of the present invention. From these methods the joint angles for the robot joints are computed and passed to block 128. Block 128 illustrates the motion command given to each robot joint motor generated from the joint angles of block 126. The motors are energized and the robot arm poses the end effector in the desired position and orientation. The process is repeated again to move the end effector.

While this invention has been described in terms of six axes of rotation, it will be evident to those skilled in the art, that this method could be easily extended to a robot manipulator having an offset wrist with a plurality of axes of rotation, with each axis of rotation associated with a corresponding joint angle.

While the invention has been illustrated in some detail according to the preferred embodiments shown in the accompanied drawings, and while the preferred embodiments have been described in some detail, there is no intention to thus limit the invention to such detail. On the contrary, it is intended to cover all modifications, alterations and equivalents falling within the scope of the present invention as set forth in the appended claims.

We claim:

1. In an articulated manipulator of the type having at least a first, a second, and a third link respectively associated with a first, a second, and a third axis of rotation of motion about an offset wrist, each link and motion being associated with a first, a second, and a third joint, a method of determining a first, a second, and a third joint angle, respectively, for each of the axis of rotation to provide control data for activating actuators being associated with a corresponding joint, to permit positioning of an end of the manipulator at a desired point, said method comprising the steps of:

(A) obtaining data identifying a desired end point position and orientation, the data including an end point position vector and an end point approach orientation vector;

(B) multiplying the end point approach orientation vector by the length of the first link;

(C) producing a first set of coordinates, by subtracting the result of step (B) of multiplying from the end point position vector;

(D) determining a first vector from the first set of coordinates along the first axis of rotation with a length of the first link;

(E) setting initially a second set of coordinates equal to the first set of coordinates;

(F) determining from the second set of coordinates a second vector along the third axis of rotation, with a length of the third link;

(G) calculating the cross-product of the first vector and second vector, to produce a third vector;

(H) multiplying the third vector by the length of the second link;

(I) computing an estimate of the second set of coordinates by subtracting the result of step (H) of multiplying, from the first set of coordinates;

(J) repeating steps (F) of determining, through steps (I) of computing, until the difference between any two successive estimations is less than a predetermined minimum value;

(K) determining said joint angles from the second set of coordinates;

(L) generating position commands from said joint angles; and (M) sending the position commands to the actuator associated with a manipulator joint to control the manipulator joint.

2. In an articulated manipulator as recited in claim 1, having a fourth link connected to a fourth joint of the third link with a fourth axis of rotation about the fourth joint, wherein the step (K) of determining said joint angles further comprises the steps of:

(A) multiplying the second vector by the length of the third link;

(B) subtracting the result of step (A) of multiplying, from the second coordinates to produce a third set of coordinates; and (C) determining the joint angle of the fourth axis of rotation from the second set of coordinates and third set of coordinates 3. In an articulated manipulator as recited in claim 2, having a plurality of serial connected links with one end of the serial connected links connected to a fourth link through a fifth joint, the other end of the links being attached to a reference point, each link being connected to a succeeding link through an intermediate joint, with each joint having a predetermined axis of rotation and a corresponding joint angle, wherein the step (C) of determining said joint angles further comprises the steps of:

(A) determining a subsequent vector from a previous link having a previous set of coordinates along a previous axis of rotation;

(B) subtracting the result of step (A) of determining, from the previous coordinates to produce a subsequent set of coordinates;

(C) computing the joint angle of a subsequent axis of rotation from the subsequent set of coordinates; and (D) repeating the steps (A) of determining, through step (C) of computing, until the reference point is reached.

4. In an articulated manipulator, as recited in claim 1, the manipulator having a plurality of serial connected links, with one end of the serial connected links attached to a reference point, each link being connected to a succeeding link through an intermediate joint, with each joint having a predetermined axis of rotation and a corresponding joint angle, a method of determining a plurality of joint angles for each axis of rotation, to provide control data for activating actuators being connected to a corresponding joint, to permit transitioning of an end of the manipulator through a singularity point, the singularity point being located within a predetermined angular band defined by an initial entry angle and a final exit angle, said method comprising the steps of:

(N) identifying positioning of the manipulator at the initial entry angle and providing data identifying a desired subsequent value for the end effector, the data including a present joint angle and a previous joint angle for each offset wrist angle;

(O) subtracting from the present joint angle, the previous joint angle for each of the offset wrist joint angles;

(P) adding the result of step (O) of subtracting, to each present joint angle to produce a corresponding subsequent joint angle;

(Q) calculating the remaining joint angles using the wrist angles obtained in step (P) of adding and the desired end effector position;

(R) generating position commands from said subsequent joint angle;

(S) sending the position commands to the actuator connected to a manipulator joint to control the manipulator joint;

(T) replacing the previous joint angle with the present joint angle;

(U) repeating step (O) of subtracting through step (T) of replacing until and the present joint angle equals the final exit angle; and (V) returning to the method of steps (A)–(M) for positioning the manipulator when the final exit angle is reached.

5. In an articulated manipulator of the type having at least a first, a second, and a third link respectively associated with a first, a second, and a third axis of rotation of motion about an offset wrist, each link and motion being associated with a first, a second, and a third joint, a method of determining a first, a second, and a third joint angle for each of the axis of rotation, to provide control data for activating actuators being associated with a corresponding joint, to permit positioning of an end of the manipulator at a desired point, said method comprising the steps of:

(A) obtaining data identifying a desired end point position and orientation, the data including an end point position vector and an end point approach orientation vector;

(B) multiplying the end point approach orientation vector by the length of the first link;

(C) producing a first set of coordinates by subtracting the result of step (B) of multiplying, from the end point position vector;

(D) determining a first vector from the first set of coordinates along the second axis of rotation with a length of the second link;

(E) subtracting the first vector from the first set of coordinates to produce a second set of coordinates;

(F) constructing a second vector from the second set of coordinates along the first axis of rotation with a length of the third link;

(G) computing an estimate of said first joint angle from the dot product of the first vector and second vector;

(H) repeating steps (D) of determining through (G) of computing, until the absolute value of the estimate of said first joint angle is less than a predetermined minimum value;

(I) determining said joint angles from said first joint angle;

(J) generating position commands from said joint angles; and (K) sending the position commands to the actuator connected to a manipulator joint to control the manipulator joint.

6. In an articulated manipulator as recited in claim 5, having a plurality of serial connected links with one end of the serial connected links connected to a third link through a fourth joint, the other end of the links being attached to a reference point, each link being connected to a succeeding link through an intermediate joint, with each joint having a predetermined axis of rotation and a corresponding joint angle, wherein the step (I) of determining said joint angles further comprise the steps of:

(A) determining from the previous set of coordinates a subsequent vector along the previous axis of rotation with a length of the previous link;

(B) subtracting the result of step (A) of determining the previous coordinates to produce a subsequent set of coordinates;

(C) computing the joint angle of the subsequent axis of rotation from the subsequent set of coordinates;

(D) repeating the steps (A) of determining through step (C) of computing until the reference point is reached.

7. In an articulated manipulator as recited in claim 5, the manipulator having a plurality of serial connected links, with one end of the serial connected links attached to a reference point, each link being connected to a succeeding link through an intermediate joint, with each joint having a predetermined axis of rotation and a corresponding joint angle, a method of determining a plurality of joint angles for each axis of rotation, to provide control data for activating actuators being connected to a corresponding joint, to permit transitioning of an end of the manipulator through a singularity point, the singularity point being located within a predetermined angular band defined by an initial entry angle and a final exit angle said method comprising the steps of:

(L) identifying positioning of the manipulator at the initial entry angle and providing data identifying a desired final value for each offset wrist joint angle at the final exit angle, the data including the initial entry angle and the final exit angle for each offset wrist joint angle, a time and an update rate for moving the manipulator from its initial position to a final position determined by the final exit angle for each joint angle;

(M) setting a present joint angle equal to each initial joint angle;

(N) subtracting from the final joint angle the present joint angle;

(O) dividing by the time for arriving at the final position of the manipulator;

(P) multiplying by the update rate for each joint angle;

(Q) adding the result of step (P) of multiplying, to each present joint angle to produce a corresponding subsequent joint angle;

(R) calculating the remaining joint angles using the wrist angles obtained in step (Q) of adding and the desired end effector position;

(S) generating position commands from said subsequent joint angle;

(T) sending the position commands to the actuator connected to a manipulator joint to control the manipulator joint;

(U) replacing the present joint angle with the subsequent joint angle;

(V) repeating step (N) of subtracting through step (U) of replacing until the subsequent joint angle is equal to the final angle for each joint angle; and (W) returning to the method of steps (A)–(K) for positioning the manipulator when the final exit angle is reached.

8. In a computer controlled articulated manipulator of the type having at least a first, a second, and a third link respectively associated with a first, a second, and a third axis of rotation of motion about an offset wrist, each link and motion being associated with a first, a second, and a third joint, and having a first and second processing method associated with the computer, a method of determining a first, a second, and a third joint angles respectively for each of the axis of rotation to provide control data for activating actuators being associated with a corresponding joint, to permit positioning of an end of the manipulator at a desired point, said method comprising the steps of:
- (A) providing data identifying a desired end point position, the data including a cartesian point on a trajectory of the end point, and predetermined limits for the second joint angle;
- (B) testing the second joint angle against the predetermined limits for the second joint angle;
- (C) computing the joint angles when the second joint angle is within the predetermined limits by the first processing method;
- (D) computing the joint angles, when the second joint angle is outside the predetermined limits by the second processing method;
- (E) generating position commands from said joint angles; and
- (F) sending position commands to the actuator connected to a manipulator to control the manipulator joint;

9. In a computer controlled articulated manipulator, as recited in claim 8, wherein the step (D) of computing, further comprises the steps of:
- (A) providing data identifying a desired end point position and orientation, the data including an end point position vector and an end point orientation vector;
- (B) multiplying the end point orientation vector by the length of the first link;
- (C) producing a first set of coordinates, by subtracting the result of step (B) of multiplying from the end point position vector;
- (D) determining a first vector from the first set of coordinates along the first axis of rotation with a length of the first link;
- (E) setting initially a second set of coordinates equal to the first set of coordinates;
- (F) determining from the second set of coordinates a second vector along the third axis of rotation, with a length of the third link;
- (G) calculating the cross-product of the first vector and second vector, to produce a third vector;
- (H) multiplying the third vector by the length of the second link;
- (I) computing an estimate of the second set of coordinates by subtracting the result of step (H) of multiplying from the first set of coordinates;
- (J) repeating steps (F) of determining, through step (I) of computing, until the difference between any two successive estimations is less than a predetermined minimum value;
- (K) determining said joint angles from the second set of coordinates.

10. In a computer controlled articulated manipulator, as recited in claim 8, wherein the step (D) of computing, further comprises the steps of:
- (A) providing data identifying a desired end point position and orientation, the data including an end point position vector and an end point orientation vector;
- (B) multiplying the end point orientation vector by the length of the third link;
- (C) producing a first set of coordinates by subtracting the result of step (B) of multiplying, from the end point position vector;
- (D) determining a first vector from the first set of coordinates along the second axis of rotation with a length of the second link;
- (E) subtracting the first vector from the first set of coordinates to produce a second set of coordinates;
- (F) constructing a second vector from the first set of coordinates along the first axis of rotation with a length of the third link;
- (G) computing an estimate of said first joint angle from the dot product of the first vector and second vector;
- (H) repeating steps of (D) of determining through (G) of computing, until the absolute value of the estimate of said first joint angle is less than a predetermined minimum value;
- (I) determining said joint angles from said first joint angle.

11. In a computer controlled articulated manipulator, as recited in claim 8, wherein the step (C) of computing further comprises the steps of:
- (A) providing data identifying a desired final value for each joint angle, the data including an initial angle and a final angle for each joint, a time and an update rate for moving the manipulator from the initial position to the final position determined by the final angle for each joint angle;
- (B) setting a present joint angle equal to each initial joint angle;
- (C) subtracting from the final joint angle the present joint angle;
- (D) dividing by the time for arriving at the final position of the manipulator;
- (E) multiplying by the update rate for each joint angle;
- (F) adding the result of step (E) of multiplying, to each present joint angle to produce a corresponding subsequent joint angle; and
- (G) repeating step (C) of subtracting, through step (F) of adding until the subsequent joint angle is equal to the third joint angle.

12. In a computer controlled articulated manipulator, as recited in claim 8, wherein the step (C) of computing, further comprises the steps of:
- (A) providing data identifying a desired subsequent value for each joint angle, the data including a present joint angle, a previous joint angle;
- (B) subtracting from the present joint angle, the previous joint angle;
- (C) adding the result of step (B) of subtracting, to each present joint angle to produce a corresponding subsequent joint angle; and
- (D) repeating step (B) of subtracting through step (C) of adding until the subsequent joint angle is the same as the third joint angle.

* * * * *